United States Patent [19]

Buma

[11] Patent Number: 4,629,168
[45] Date of Patent: Dec. 16, 1986

[54] BUSHING ASSEMBLY FOR AIR SUSPENSION

[75] Inventor: Shuuichi Buma, Toyota, Japan

[73] Assignee: Toyota Jidosha Kabushiki Kaisha, Toyota, Japan

[21] Appl. No.: 719,457

[22] Filed: Apr. 3, 1985

[30] Foreign Application Priority Data

Jul. 24, 1984 [JP] Japan .................. 59-111060[U]

[51] Int. Cl.⁴ .............................................. B60G 3/00
[52] U.S. Cl. ..................................... 267/35; 267/8 R; 280/668
[58] Field of Search ............... 267/8 R, 22 R, 33, 35, 267/64.15, 64.19, 64.23, 64.27, 67; 280/668, 673, 698

[56] References Cited

U.S. PATENT DOCUMENTS 3,000,625  9/1961  Polhemus .
3,279,782  10/1966  Schick ........................... 280/668 X
4,364,582  12/1982  Takahashi et al. .................. 280/698
4,474,363  10/1984  Numazawa et al. ............. 280/668 X

FOREIGN PATENT DOCUMENTS 1762410  10/1957  Fed. Rep. of Germany .
3226886  1/1984  Fed. Rep. of Germany ...... 280/668
3447750  7/1985  Fed. Rep. of Germany .

Primary Examiner—Duane A. Reger
Attorney, Agent, or Firm—Oblon, Fisher, Spivak, McClelland & Maier

[57] ABSTRACT

A bushing assembly is interposed between a main air chamber and an auxiliary air chamber of an air suspension. The bushing assembly includes a tubular rubber bushing axially subjected to the internal pressure in the main air chamber, an inner tube fixed to an inner peripheral surface of the bushing and an outer tube fixed to an outer peripheral surface of the bushing. The bushing is formed to be compressed by the inner and outer tubes in at least an axial portion thereof when subjected to the internal pressure in the main air chamber.

9 Claims, 6 Drawing Figures

BUSHING ASSEMBLY FOR AIR SUSPENSION

BACKGROUND OF THE INVENTION

1. Field of the Invention

This invention relates to a bushing assembly for an air suspension assembly, and more particularly to a bushing assembly for a strut type air suspension provided with a main air chamber and an auxiliary air chamber and used for an automobile.

2. Description of the Prior Art

A strut type air suspension has been proposed in which a main air chamber and an auxiliary air chamber formed to surround a shock absorber are filled with compressed air to constitute an air spring and the spring constant is varied by affording and shutting off communication between the main air chamber and the auxiliary air chamber by a valve body.

SUMMARY OF THE INVENTION

In a suspension which is constituted to dispose an auxiliary air chamber above a main air chamber and utilize a rubber bushing provided on a support interposed between a shock absorber and a car body for a partition between the main air chamber and the auxiliary air chamber, the internal pressure in the main air chamber acts axially on the bushing so that the bushing tends to be pulled apart from an inner tube disposed inside the bushing and connected to a piston rod of the shock absorber and an outer tube disposed outside the bushing and fixed to the car body, resulting in the degradation of the sealing property.

An object of the present invention is to provide a bushing assembly for an air suspension which can improve the sealing property between a bushing and an inner and outer tubes even if the adhesive strength between the bushing and the inner and outer tubes is equal to a prior one.

According to the present invention is provide a bushing assembly interposed between a main air chamber and an auxiliary air chamber of an air suspension, which comprises a tubular rubber bushing subjected to the internal pressure in said main air chamber axially, an inner tube fixed to an inner peripheral surface of said bushing and an outer tube fixed to an outer peripheral surface of said bushing, whereby said bushing is formed so as to be compressed by said inner and outer tubes in at least an axial portion thereof when subjected to the internal pressure.

In a preferred embodiment of the present invention, a contact area between the bushing and the inner and/or outer tubes is formed to be increased. As a result, the contact force is increased to improve the sealing property.

According to the present invention, since the bushing deformed by the internal pressure in the main air chamber is compressed by the inner and outer tubes to vary the volume, the sealing property in the contact portions between the bushing and the inner and outer tubes can be increased to improve the reliability of the air suspension against air leakage.

Since the bushing is compressed, even if cracks occur in the contact surfaces between the bushing and the inner and/or outer tubes, the compressive force can serve to close the cracks and prevent abrupt air leakage so that not only the degree of controllability can be improved, but also any danger such as rapid decrease in car height can be prevented. Various other objects, features and attendant advantages of the present invention will be more fully appreciated as the same becomes better understood from the following detailed description when considered in connected with the accompanying drawings in which like reference characters designate like or corresponding parts throughout the several views and wherein.

DESCRIPTION OF THE PREFERRED EMBODIMENTS

Figure 1:
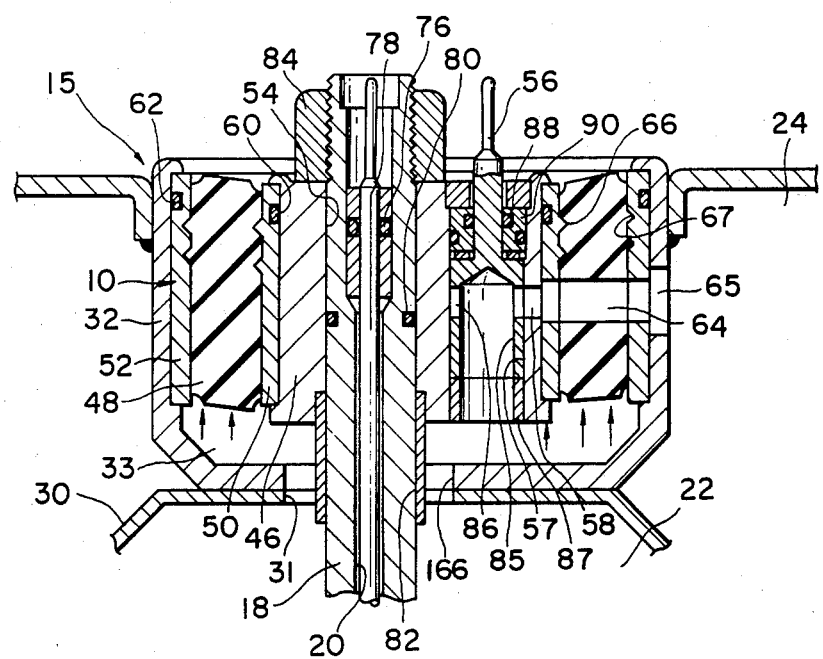
FIG. 1 is a sectional view showing a bushing assembly according to the present invention.
Figure 2:
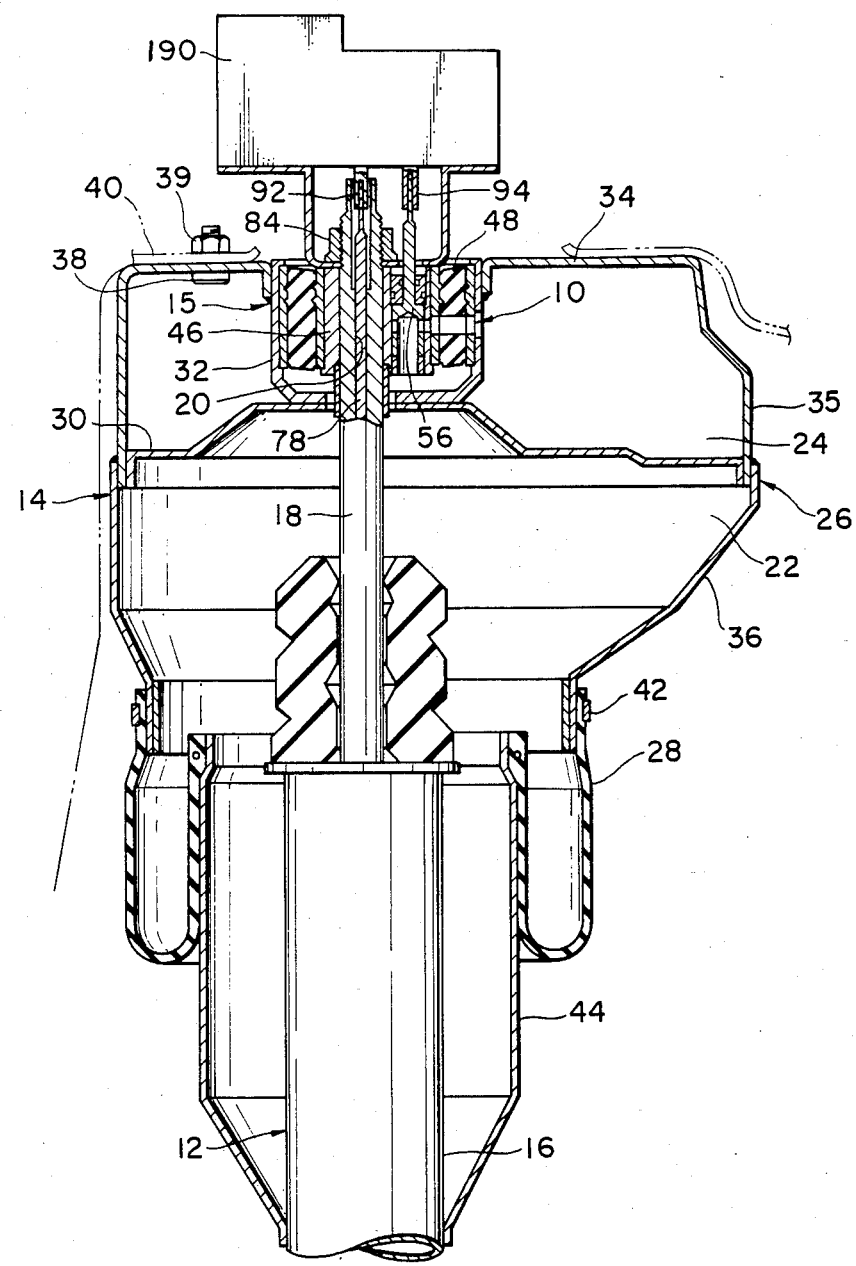
FIG. 2 is a sectional view showing an air suspension assembly incorporating the bushing assembly.

As shown in FIGS. 1 and 2, a bushing assembly 10 is provided on a support 15 of a suspension surrounding an upper end of a shock absorber 12 with an air spring 14.

The shock absorber 12 is known per se which comprises a cylinder 16, a piston (not shown) disposed movably inside the cylinder 16 and a piston rod 18 connected to the piston to project from the cylinder 16 to the outside. The shock absorber 12 is connected to a suspension arm (not shown) on a lower end.

The shock absorber 12 may be of a so-called mono tube type having only a single cylinder in addition being of a so-called twin tube type provided with the inside and outside cylinders. In the embodiment shown in the drawing, the piston rod 18 has a longitudinal hole 20 extending axially from an upper end face.

The air spring 14 is constituted from a main air chamber 22 and an auxiliary air chamber 24, both chambers being filled with compressed air. The main air chamber 22 is formed in cooperation with a housing 26, a diaphragm 28 and a partition member 30. On the other hand, the auxiliary air chamber 24 is formed in cooperation with the housing 26 and the partition member 30.

The housing 26 has a planer annular ceiling portion 34 in which an inner peripheral edge is welded over the whole periphery of a support member 32 of the support 15, a first tubular portion 35 extending integrally from the ceiling portion and a second tubular portion 36. A plurality of bolts 38 (one of them is shown in the drawing) are fixed airtightly on the ceiling portion 34 of the housing 26 by welding. The housing 26 is connected to a car body 40 by the bolts 38 extending through the car body 40 and nuts 39 screwed onto the bolts 38. To the first tubular portion 35 of the housing 26 is welded an outer peripheral edge of the annular partition member 30 over the whole periphery, and an inner peripheral edge of the partition member 30 is welded to the support member 32 over the whole periphery. The first tubular portion 35 of the housing 26 is fitted in the second tubular portion 36, both being welded to each other over the whole periphery.

The diaphragm 28 is formed cylindrically of rubber and is folded at the approximately central portion. An outer end thereof is sandwiched between the second tubular portion 36 of the housing 26 and a ring 42 and fixed to the housing 26 by caulking the ring 42. An inner end of the diaphragm 28 is fitted onto a cylindrical air piston 44 welded to the cylinder 16 over the whole periphery.

The support 15 comprises the bushing assembly 10, the support member 32 surrounding the bushing assembly 10 and a connecting member 46 disposed inside the bushing assembly 10.

The bushing assembly 10 comprises a bushing 48 formed cylindrically of rubber, an inner tube 50 and an outer tube 52, the inner tube 50 and the outer tube 52 being fixed to the bushing 48 by vulcanizing adhesion, adhesive or the like.

The connecting member 46 is formed of high rigidity material like iron having a circular cross-section. As shown in detail in FIG. 1, the member 46 has a hole 54 through which the piston rod 18 extends, a hole 57 provided parallel to the hole 54 to dispose a valve body 56 and a path 58 provided diametrically from the hole 57.

The connecting member 46 is fitted in the inner tube 50 of the bushing assembly 10 through an O-ring 60 and caulked to couple the bushing assembly 10 with the connecting member 46. The outer tube 52 of the bushing assembly 10 is fitted in the support member 32 through an O-ring 62 and the bushing assembly 10 is coupled with the same by caulking the support member 32. The bushing assembly 10 has a passage or path 64 communicating to the path 58 in the connecting member 46, and the support member 32 has a passage or path 65 communicating to the path 64 and opening to the auxiliary air chamber 24.

The support member 32 has in the central portion a hole 66 and the partition member 30 has a hole 31 respectively through which the piston rod 18 extends. As a result, the pressure in the main air chamber 22 is transmitted through the respective holes to a space 33 surrounded by the support member 32 to act on an end face of the bushing 48 as shown by the arrows. The main air chamber 22 and the auxiliary air chamber 24 communicate with each other through the hole 31 in the partition member 30, the hole 66 in the support member 32, the hole 57 and the path 58 in the connecting member 46, the path 64 in the bushing assembly 10 and the path 65 in the support member 32.

The internal pressure in the main air chamber 22 acts on the bushing 48 of the bushing assembly 10 in use axially of the piston rod 18 to deform axially the bushing 48. When subjected to the internal pressure, the bushing 48 is compressed in at least a portion thereof by the inner tube 50 and the outer tube 52 to vary the volume.

Figure 3:
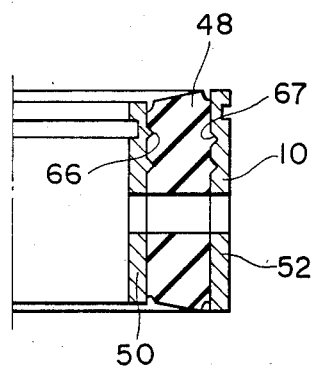
FIGS. 3 to 6 are sectional views showing essential parts of the bushing assembly

In the embodiment shown in FIGS. 1 and 3, the inner tube 50 is provided on an outer peripheral surface with two projections 66 extending circumferentially and spaced from each other, and the outer tube 52 is provided in positions of an inner peripheral surface opposed to the projections 66 with two grooves 67 extending circumferentially. The contact areas between the bushing 48 and the inner and outer tubes 50, 52 are increased by the presence of the projections 66 and the grooves 67. As the bushing 48 is axially deformed by the internal pressure and the outer tube 52 is fixed to the car body 40 through the supporting member 32 and housing 26, the inner tube 50 is axially displaced so that each of the projections 66 gets out of each of the grooves 67 to compress the bushing 48.

Figure 4:
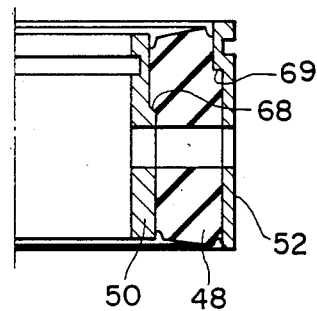

In the embodiment shown in FIG. 4, the inner tube 50 has on an outer periphery a shoulder 68 and the outer tube 52 has on an inner periphery a shoulder 69 spaced axially from the shoulder 68. The contact area of the bushing 48 is increased by the area of each shoulder. When the bushing 48 is deformed axially by the internal pressure, the shoulder 68 of the inner tube 50 is displaced toward the shoulder 69 of the outer tube 52 to compress the bushing 48. The shoulders of the inner and outer tubes may be replaced by projections.

Figure 5:
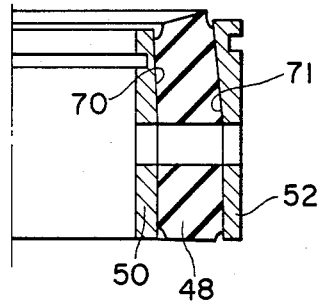

In the embodiment shown in FIG. 5, an outer peripheral surface 70 of the inner tube 50 is bent so as to be convex and an inner peripheral surface 71 of the outer tube 52 is bent so as to be concave. The contact area of the bushing 48 is increased by the bent portions of the inner and outer peripheral surfaces. When the bushing 48 is deformed axially by the internal pressure, the bushing 48 is compressed by the cooperation of the outer peripheral surface 70 of the inner tube 50 and the inner peripheral surface 71 of the outer tube 52. In this embodiment, the spring constant of the bushing 48 is capable of having non-linear characteristics such that the spring constant is lowered in a low load region while abruptly being raised in a high load region, so as to provide a better ride in the low load region.

In a modification of the embodiment in FIG. 5, the outer peripheral surface 70 of the inner tube 50 may be bent so as to be concave and the inner peripheral surface 71 of the outer tube 52 may be bent so as to be convex.

Figure 6:
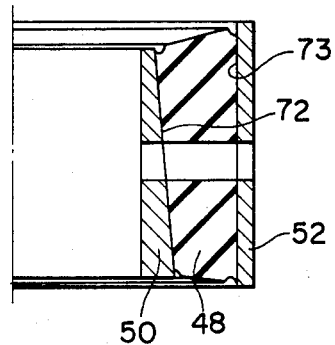

In the embodiment shown in FIG. 6, an outer peripheral surface 72 of the inner tube 50 is tapered converging upward and an inner peripheral surface 73 of the outer tube 52 is formed with a straight one. The contact area of the bushing 48 is increased by the tapered surface 72 of the outer tube 50. When the bushing 48 is deformed axially by the internal pressure, the bushing 48 is compressed by the outer peripheral surface 72 of the inner tube 50.

In a modification of the embodiment in FIG. 6, the inner peripheral surface 73 of the outer tube 52 may be tapered converging upward and the outer peripheral surface of the inner tube 50 may be tapered converging upward or formed with a straight surface.

A sealing O-ring 76 is interposed in the longitudinal hole 20 in the piston rod 18 to dispose liquid-tightly and rotatably a control shaft 78 therein. The lower end of the control shaft 78 is connected to a mechanism for regulating the damping force of the shock absorber, which is known per se. A sealing O-ring 80 is attached to an outer periphery of the piston rod 18 extending through the hole 54 in the connecting member 46, and a ring 82 fixed to the piston rod 18 bears against the connecting member 46. A nut 84 is screwed onto the piston rod 18 to couple the piston rod 18 with the connecting member 46.

The valve body 56 is provided in the lower end with a hole 85 from which a path 86 communicating to the path 58 in the connecting member 46 is provided diametrically. The valve body 56 inserted into the hole 57 in the connecting member 46 is rotatably held by a spacer 87 forced into a lower portion of the hole 57 and a collar 90 forced into an upper portion of the hole 57 and having a sealing O-ring 88 interposed. When the valve body 56 is rotated by 90° for example, communication between the main air chamber 22 and the auxiliary air chamber 24 is shut off.

An actuator 190 comprises a motor and reduction gear (not shown) which are known per se, and the rotation of the motor is properly decelerated so as to be taken out to first and second shafts 92, 94. The first shaft 92 and the second shaft 94 are respectively connected to a control rod 78 and the valve body 56 to operate the control rod 78 and the valve body 56 with the same actuator. Thus, the damping force of the shock absorber 12 and the spring constant of the air spring 14 can be adjusted at the same time.

In said respective embodiments, the outer tube 52 is coupled with the car body through the housing 26, and the piston rod 18 of the shock absorber 12 is coupled with the inner tube 50 through the connecting member 46. As a result, most of load applied from the air spring 14 is transmitted directly to the car body so that the load applied from the shock absorber 12 can be transmitted to the car body through the bushing 48 to set the spring constant of the bushing 48 as soft as possible.

Obviously, numerous modifications and variations of the present invention are possible in light of the above teachings. It is therefore to be understood that within the scope of the appended claims, the invention may be practiced otherwise than as specifically described herein.

What is claimed is:

1. A bushing assembly for an air suspension assembly which is constituted to dispose an auxiliary air chamber above a main air chamber, the bushing assembly being interposed between a shock absorber and a housing for forming the air chambers and the bushing assembly working as a part of a partition disposed between the air chambers, the bushing assembly comprising:
   a tubular rubber bushing on which the internal pressure in said main air chamber acts axially;
   an inner tube fixed to an inner peripheral surface of said bushing and connected to said shock absorber and
   an outer tube fixed to an outer peripheral surface of said bushing and connected to said housing;
   wherein said bushing is compressed by said inner and outer tubes in at least an axial portion thereof when subjected to the internal pressure.

2. A bushing assembly for an air suspension assembly as claimed in claim 1, wherein said bushing is formed to increase a contact surface with one of the inner and outer tubes.

3. A bushing assembly for an air suspension as claimed in claim 1, wherein one of said inner and outer tubes is provided on a peripheral surface with at least one projection extending circumferentially and the other is provided on a peripheral surface with grooves opposed respectively to said projections and extending circumferentially.

4. A bushing assembly for an air suspension as claimed in claim 1, wherein one of said inner and outer tubes is provided on a peripheral surface with a projection projecting diametrically and the other is provided on a peripheral surface with a projection projecting diametrically and spaced from said projection axially of the piston rod.

5. A bushing assembly for an air suspension as claimed in claim 4, wherein said projection is a shoulder.

6. A bushing assembly for an air suspension as claimed in claim 1, wherein one of said inner and outer tubes has a convex bent peripheral surface and the other has a concave bent peripheral surface.

7. A bushing assembly for an air suspension assembly as claimed in claim 1, wherein said inner tube has a tapered outer peripheral surface converging upward and an inner surface of said outer tube is formed by a face which does not diverge upward.

8. A bushing assembly for an air suspension as claimed in claim 1, wherein said inner tube has a straight outer peripheral surface and said outer tube has a tapered inner peripheral surface converging upward.

9. A bushing assembly for an air suspension assembly which is constituted so as to dispose, the bushing assembly being interposed between a shock absorber and a housing for forming the air chambers and the bushing assembly working as a part of a partition disposed between the air chambers, the bushing assembly comprising:
   a tubular rubber bushing on which the internal pressure in said main air chamber acts axially;
   an inner tube fixed to an inner peripheral surface of said bushing and connected to said shock absorber; and
   an outer tube fixed to an outer peripheral surface of said bushing and connected to said housing and thereby to a car body;
   wherein said bushing increases a contact surface between itself and one of the inner and outer tubes and is compressed by said inner and outer tubes in at least an axial portion thereof when subjected to the internal pressure.

* * * * *